Patented May 22, 1928.

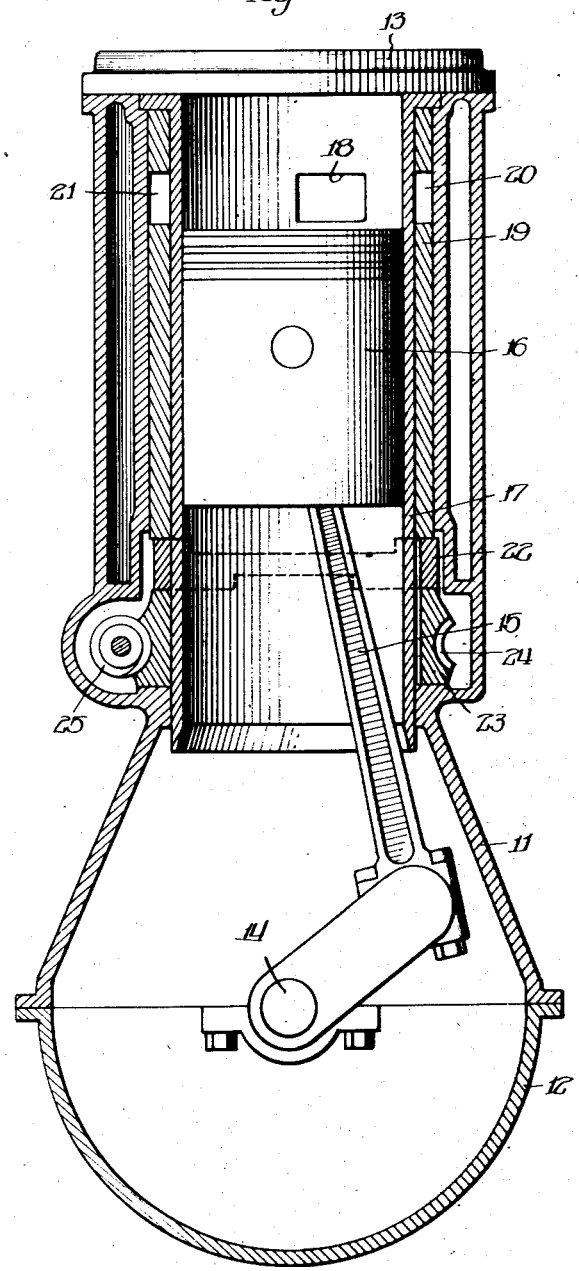
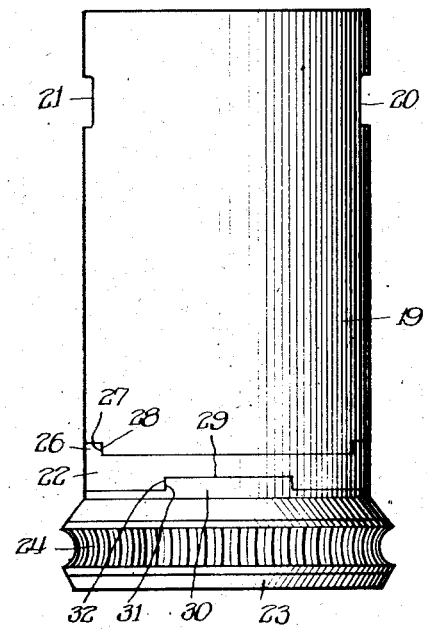
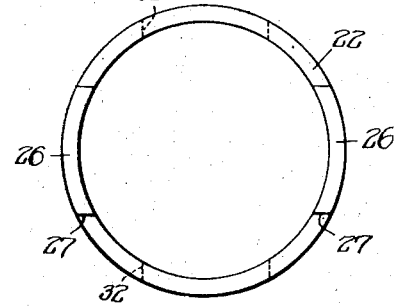

1,670,293

UNITED STATES PATENT OFFICE.

JOSEPH A. ANGLADA, OF JENKINTOWN, PENNSYLVANIA, ASSIGNOR TO BONNER-CHARTER CORPORATION, OF DOVER, DELAWARE, A CORPORATION OF DELAWARE.

MISALIGNMENT COUPLING FOR SLEEVE-VALVE ENGINES.

Application filed November 2, 1925. Serial No. 66,172.

This invention relates to driving means for sleeve valves or the like, and more particularly, to driving means for rotating sleeve valves of the type used in internal combustion motors.

In a sleeve valve of this type it has been generally customary to rotate the sleeve valve by means of a separate gear ring which is connected to the sleeve valve by means of a jaw clutch. This method of connection necessitates extreme accuracy in manufacture, since for proper working, the valve and gear ring must be in perfect axial alignment. If exact alignment does not exist, the gear and valve will revolve eccentrically and the consequent gyration of both the gear and valve will necessitate an excessive amount of clearance between the valve and member in contact with which it rotates. Such an excessive clearance prevents the valve from functioning properly since gas leakage is facilitated and it is impossible to properly control the flow and distribution of lubricant.

It is an object of the present invention to provide connection of this character in which the valve shall be radially independent of the driving gear.

It is a further object to provide construction in which the valve and drive ring may move radially relative to each other during their rotation without strain upon the driving connection.

It is an additional object to provide a construction of this character which is simple in design and is adapted for commercial production and operation.

Other and further objects will appear as the description proceeds.

I have illustrated a preferred embodiment in the accompanying drawings, in which Figure 1 is a vertical section of an engine cylinder with my invention applied thereto;

Figure 2 is an elevation of the sleeve valve, coupling member and drive ring, and Figure 3 is a plan view of the drive ring.

A sleeve valve engine has been shown somewhat diagrammatically in Figure 1 and comprises the cylinder block 11, crank case 12, cylinder head 13, crank shaft 14, connecting rod 15 and piston 16. The piston reciprocates in the inner cylinder member 17 which is retained in the cylinder block 11. The inner cylinder member is provided with a port 18 in registration with a similar port in the cylinder block.

The sleeve valve 19 is fitted between the cylinder block 11 and inner cylinder member 17, and is provided with a plurality of ports 20 and 21 which periodically register with the cylinder port 18. The sleeve valve 19 is connected by the coupling member 22 to the gear ring 23. The gear ring 23 is provided with the worm gear 24 which meshes with the worm 25.

The coupling member 22 is provided on its upper surface with the upwardly extending jaws 26, the sides 27 of which engage similar surfaces 28 formed on the sleeve valve 19. The lower surface of the coupling member 22 is recessed at 29 to receive the jaws 30 formed on the upper surface of the gear ring 23. The lateral faces 31 of these jaws engage similar surfaces 32 formed on the coupling member. It will be noted from Figure 3 that the surfaces 27 and 32 are formed substantially at right angles to each other.

It will be understood that in the operation of the engine the gear ring 23 is continuously rotated by the worm 25. This rotation is transmitted by the meeting jaws to the coupling member 22 and thence to the sleeve valve 19. It will be apparent that the meeting jaws between the gear ring and coupling and coupling and sleeve valve being at right angles to each other will permit eccentricity of the sleeve valve and gear ring without strain upon the driving connection. The sleeve valve may thus make a gas and oil tight fit with the cylinder block and inner cylinder without the necessity for having the gear ring machined and fitted absolutely concentric with the sleeve valve. It will be understood that the usual eccentricity will be a very minute fraction of an inch and it has been considerably exaggerated in the drawings for the sake of clearness.

I have shown one preferred form of construction by way of example only and contemplate such changes and modifications as come within the spirit and scope of the accompanying claims.

I claim:—

1. In a sleeve valve construction, a sleeve valve, a drive member, and a coupling member for the sleeve valve and drive member, said coupling member being adapted to transmit driving force between the valve and drive member when these members are eccentrically located.

2. In a sleeve valve construction, a sleeve valve, a drive member, a coupling member between the valve and drive member and jaw clutches on the coacting faces of the sleeve valve, coupling member and drive member, the plane of the meeting faces of the jaws of one clutch being at substantially right angles to the plane of the jaws of the other clutch.

Signed at New York city, this 28 day of October, 1925.

JOSEPH A. ANGLADA.